United States Patent
Crespo et al.

(10) Patent No.: US 7,865,399 B2
(45) Date of Patent: Jan. 4, 2011

(54) DISTRIBUTED ELECTRONIC COMMERCE SYSTEM WITH CENTRALIZED POINT OF PURCHASE

(75) Inventors: Arturo E. Crespo, Sunnyvale, CA (US); Louis Vincent Perrochon, Mountain View, CA (US); Timothy M. Dierks, New York, NY (US)

(73) Assignee: Google Inc., Mountain View, CA (US)

( * ) Notice: Subject to any disclaimer, the term of this patent is extended or adjusted under 35 U.S.C. 154(b) by 704 days.

(21) Appl. No.: 11/112,176

(22) Filed: Apr. 22, 2005

(65) Prior Publication Data

US 2006/0242026 A1 Oct. 26, 2006

(51) Int. Cl.
*G06Q 30/00* (2006.01)

(52) U.S. Cl. .............................. 705/26; 705/21; 705/27; 705/37; 705/39

(58) Field of Classification Search .................. 705/26, 705/27, 39, 21, 37
See application file for complete search history.

(56) References Cited

U.S. PATENT DOCUMENTS

| | | | |
|---|---|---|---|
| 5,802,497 | A | 9/1998 | Manasse |
| 5,999,914 | A | 12/1999 | Blinn et al. |
| 6,029,141 | A | 2/2000 | Bezos et al. |
| 6,134,307 | A | 10/2000 | Brouckman et al. |
| 6,453,305 | B1 | 9/2002 | Glassman et al. |
| 6,499,052 | B1 | 12/2002 | Hoang et al. |
| 6,523,012 | B1 | 2/2003 | Glassman et al. |
| 6,850,917 | B1 | 2/2005 | Hom et al. |
| 6,925,444 | B1 | 8/2005 | McCollom et al. |
| 6,934,690 | B1 | 8/2005 | Van Horn et al. |
| 7,089,198 | B2 | 8/2006 | Freedenberg et al. |
| 7,197,475 | B1 | 3/2007 | Lorenzen et al. |
| 2001/0007099 | A1 | 7/2001 | Rau et al. |
| 2002/0016766 | A1* | 2/2002 | Raja ............................. 705/39 |
| 2002/0052792 | A1 | 5/2002 | Johnson et al. |
| 2002/0107772 | A1* | 8/2002 | Jain et al. ...................... 705/37 |
| 2002/0120475 | A1* | 8/2002 | Morimoto ...................... 705/4 |

(Continued)

FOREIGN PATENT DOCUMENTS

WO    WO 02/29508 A2    4/2002

OTHER PUBLICATIONS

Bezard, Gwenn, "Online Micro-Payments: Has the Time Come?", banktech.com, [online] [Retrieved on Jan. 26, 2005] Retrieved from the Internet: <URL:http://www.banktech.com/utils/printableArticle.jhtml?doc_id=17700519>.

(Continued)

*Primary Examiner*—Yogesh C Garg
(74) *Attorney, Agent, or Firm*—Fenwick & West LLP

(57) ABSTRACT

An electronic commerce system includes a broker that enables customers to purchase items from merchants. A customer interacts with the merchant to identify items to purchase, and the merchant directs the customer to the broker in order to complete the transaction. The broker receives a description of a virtual shopping cart generated by the merchant and presents the customer with an interface allowing the customer to select shipping and other options for the purchase. The broker calculates a total amount for the transaction based on the shopping cart description and the options selected by the customer. The broker informs the merchant of the purchase and coordinates the shipment of the purchased items from the merchant to the customer.

28 Claims, 5 Drawing Sheets

U.S. PATENT DOCUMENTS

| | | |
|---|---|---|
| 2002/0120530 A1 | 8/2002 | Sutton et al. |
| 2002/0120864 A1* | 8/2002 | Wu et al. .................... 713/201 |
| 2002/0194087 A1 | 12/2002 | Spiegel et al. |
| 2003/0033205 A1 | 2/2003 | Nowers et al. |
| 2003/0050855 A1* | 3/2003 | Jaffe et al. .................... 705/26 |
| 2003/0065577 A1 | 4/2003 | Haynes et al. |
| 2003/0093320 A1 | 5/2003 | Sullivan |
| 2004/0002906 A1 | 1/2004 | Von Drehnen et al. |
| 2004/0030619 A1 | 2/2004 | Stokes et al. |
| 2004/0073498 A1* | 4/2004 | Breen et al. .................... 705/27 |
| 2004/0117261 A1 | 6/2004 | Walker et al. |
| 2004/0254844 A1* | 12/2004 | Torres ......................... 705/26 |
| 2005/0033694 A1 | 2/2005 | Perrin |
| 2005/0108104 A1* | 5/2005 | Woo ............................ 705/26 |
| 2005/0204041 A1* | 9/2005 | Blinn et al. ................. 709/225 |
| 2005/0228750 A1* | 10/2005 | Olliphant et al. .............. 705/40 |
| 2005/0256806 A1* | 11/2005 | Tien et al. ..................... 705/64 |
| 2006/0097044 A1 | 5/2006 | Boyd et al. |
| 2006/0122895 A1 | 6/2006 | Abraham et al. |
| 2006/0248011 A1 | 11/2006 | Hecht-Nielsen et al. |
| 2007/0043636 A1 | 2/2007 | Foster |
| 2008/0120129 A1 | 5/2008 | Seubert et al. |

OTHER PUBLICATIONS

BitPass, Press Release (2003) "BitPass Announces General Availability of Micropayment System," [online] [Retrieved on Jan. 26, 2005] Retrieved from the Internet: <URL:https://www.bitpass.com/learn/releases/releases2003.html>.

Geer, David, "E-Micropayments Sweat the Small Stuff," *IEEE Computer*, vol. 37, No. 8, Aug. 2004, pp. 19-22.

Rivest, R.L. et al., "PayWord and MicroMint: Two Simple Micropayment Schemes," MIT Laboratory for Computer Science, Cambridge, Mass and Weizmann Institute of Science, Applied Mathematics Department, Rehovot, Israel, May 7, 1996, pp. 1-18.

Sung-Ming Yen and Pao-Yu Ku, "Improved Micro-payment System, Technical Report TR-98-2," TamKang University, Department of Electrical Engineering, Laboratory of Cryptography and Information Security, Taiwan, Apr. 27, 1998, pp. 1-12.

PCT International Search Report and Written Opinion, PCT/US06/14251, Sep. 10, 2007, 7 pages.

PCT International Search Report and Written Opinion, PCT/US07/72269, Aug. 14, 2008, 12 Pages.

"Happy Birthday Yahoo! Canada Shopping," Canada NewsWire, Nov. 26, 2001, p. 1.

* cited by examiner

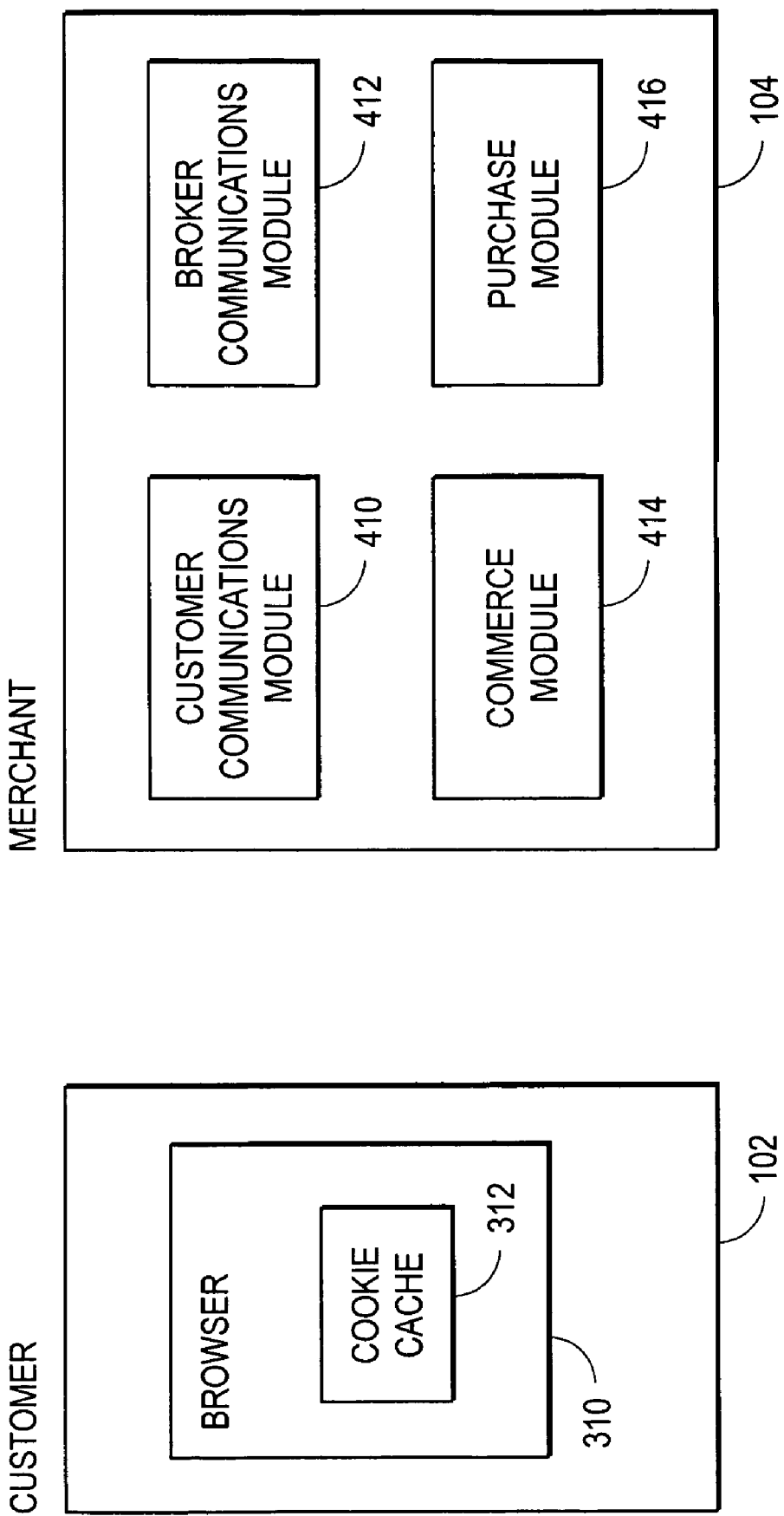

DISTRIBUTED ELECTRONIC COMMERCE SYSTEM WITH CENTRALIZED POINT OF PURCHASE

BACKGROUND OF THE INVENTION

1. Field of the Invention

This invention pertains in general to electronic commerce and in particular to a system centralizing purchases from multiple Internet-based merchants.

2. Description of the Related Art

Electronic commerce on the Internet has become commonplace. There are many merchants offering goods and services via web sites on the Internet, and there are an even greater number of customers who purchase the goods and services. In many cases, the electronic commerce transactions involve physical goods. For example, many customers purchase items such as books, compact disks (CDs) and DVDs via the Internet. Customers can also purchase electronic content such as downloadable text and/or music and access to web sites that provide news or entertainment stories.

Most electronic commerce sites on the Internet use ad hoc purchasing systems. For example, a web-based music merchant typically has a purchasing system that is valid for only that merchant's family of web sites. Therefore, a customer must establish an account and/or provide payment information to each merchant that the customer patronizes. These separate accounts are inconvenient to both parties. The merchant must maintain a dedicated account management and payment system. The customer must establish separate accounts with numerous merchants.

Due to these inconveniences, customers are often reluctant to purchase items from smaller or relatively unknown merchants. These merchants lack the brand recognition and trust associated with larger, better known merchants. Therefore, the customers hesitate to engage in risky behavior, such as providing a credit card number or shipping address, to the merchants. As a result, there is a need in the art for an electronic commerce system that alleviates these customer concerns and allows smaller or lesser known merchants to compete on a level playing field with larger merchants.

BRIEF SUMMARY OF THE INVENTION

The above need is met by an electronic commerce system that, in one embodiment, comprises a communication module for receiving a description of a virtual shopping cart identifying items for purchase by a remote customer and presenting the customer with an interface with which the customer can select options associated with the purchase; a transaction module for calculating a purchase total responsive to the shopping cart description and options selected by the customer, and for effecting the purchase by charging the customer for the purchase total; and a coordination module for interfacing with a remote merchant to inform the merchant of the purchase and coordinating delivery of the purchased items to the customer.

BRIEF DESCRIPTION OF THE DRAWINGS

FIG. 3 is a high-level block diagram illustrating modules within a customer according to one embodiment.

FIG. 4 is a high-level block diagram illustrating modules within a merchant according to one embodiment.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION OF THE PREFERRED EMBODIMENTS

A. Overview

Figure 1:
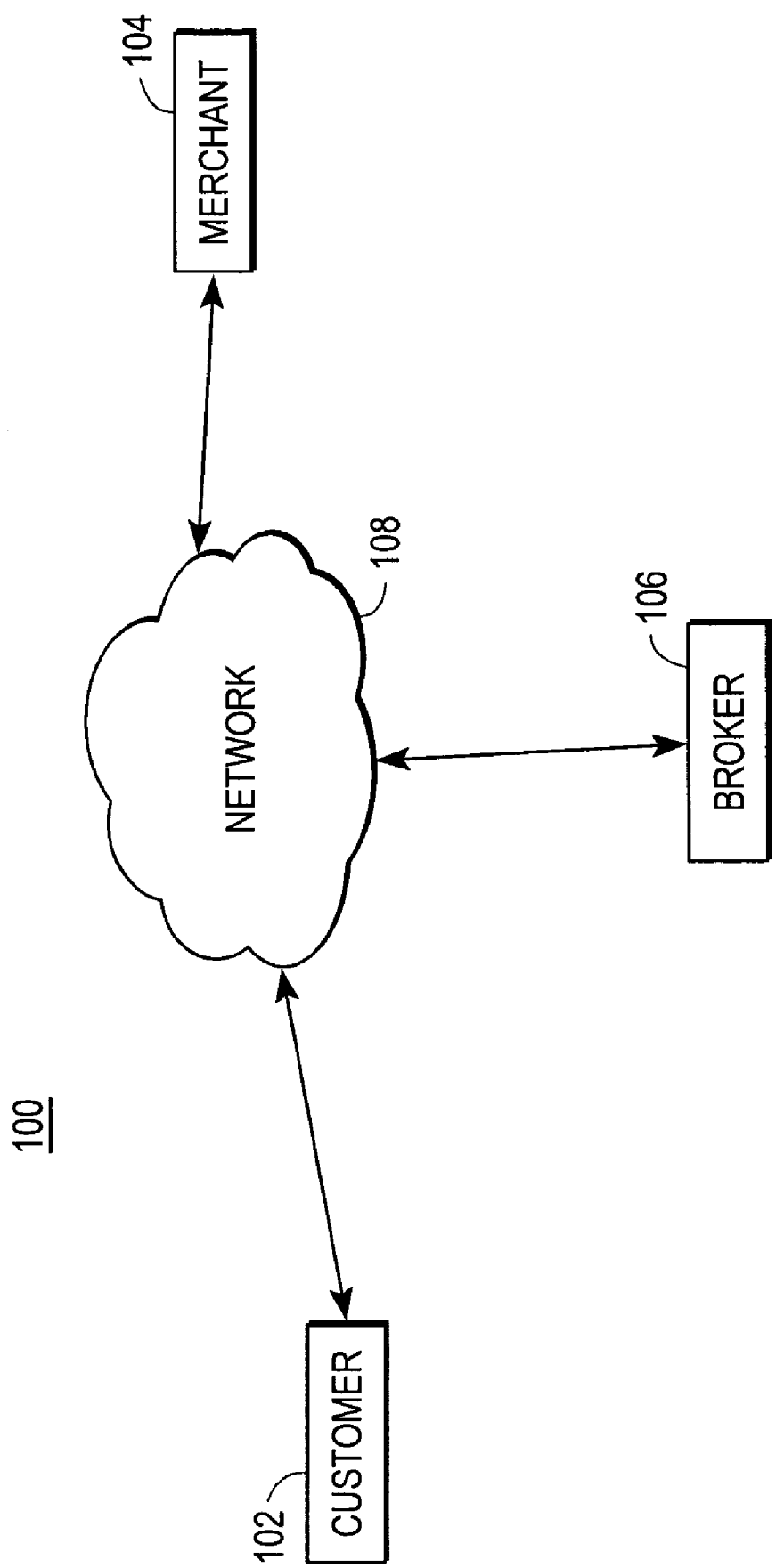
FIG. 1 is a high-level block diagram of a computing environment according to one embodiment of the present invention.

FIG. 1 is a high-level block diagram of a computing environment 100 according to one embodiment of the present invention. FIG. 1 illustrates a customer 102, a merchant 104, and a broker 106 connected by a network 108.

The customer 102 in this embodiment represents an entity that obtains items via the network 108 through purchases or other types of transactions. The customer 102 is sometimes referred to as the "buyer" and the transaction is sometimes referred to as a "sale" or "purchase." As used herein, these terms also refer to other types of transactions, regardless of whether the customer is technically a "buyer" or the transaction is technically a "sale."

In one embodiment, the customer 102 includes a computer system that is utilized by an end-user to communicate with other computers on the network 108 in order to effect a purchase. The computer system, for example, can be a personal computer executing a web browser such as MICROSOFT INTERNET EXPLORER that allows the end-user to retrieve and display content from web servers and other computer systems on the network 108. In other embodiments, the customer 102 includes a network-capable device other than a computer system, such as a personal digital assistant (PDA), a cellular telephone, a pager, a television "set-top box" etc. Although FIG. 1 illustrates only a single customer 102, embodiments of the present invention can have thousands or millions of customers participating in the electronic commerce system described herein. The single customer 102 is illustrated in order to simplify and clarify the present description. As used herein, the reference number 102 refers to both a single customer and/or a set of customers, depending upon the context.

Similarly, the merchant 104 represents an entity that sells items on the network 108 or makes items available through types of transactions. The merchant 104 offering the item to the buyer is sometimes referred to as the "seller" and the transaction is sometimes referred to as a "sale" or "purchase." As used herein, these terms also refer to other types of transactions, regardless of whether the merchant is technically a "seller" or the transaction is technically a "sale."

In one embodiment, the merchant 104 includes a computer system acting as a web server that is utilized to offer the items to potential customers 102. The items offered by the merchant 104 can include tangible items such as books, CDs, DVDs, digital cameras and other types of electronic goods, etc. The items offered by the merchant 104 can also include intangible items such as services and electronic content such as web pages, downloadable files, streaming media, etc. Although FIG. 1 illustrates only a single merchant 104, embodiments of the present invention can have many merchants participating in the electronic commerce system. The single merchant 104 is illustrated in order to simplify and clarify the present description. As used herein, the reference number 104 refers to both a single merchant and/or a set of merchants, depending upon the context.

The broker 106 represents an entity that serves as an intermediary for the transaction between the customer 102 and the merchant 104. In one embodiment, the broker 106 operates a system that functions as a centralized place that the customers 102 can use to pay for items offered by the merchants. Thus, the customers 102 can patronize multiple merchants 104 while providing their payment information to only the broker 106. Although FIG. 1 illustrates only a single broker 106, embodiments of the present invention can have multiple brokers participating in the electronic commerce system. In one embodiment, the broker 106 is said to be "remote" from the customer 102 and/or merchant 104. "Remote" in this context means that the broker is logically separate from the customer and/or merchant, and does not necessarily refer to a physical distance between the entities.

The network 108 represents the communication pathways between the customer 102, merchant 104, and broker 106. In one embodiment, the network 108 is the Internet. The network 108 can also utilize dedicated or private communications links that are not necessarily part of the Internet. In one embodiment, the network 108 uses standard communications technologies and/or protocols. Thus, the network 108 can include links using technologies such as 802.11, integrated services digital network (ISDN), digital subscriber line (DSL), asynchronous transfer mode (ATM), etc. Similarly, the networking protocols used on the network 108 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

II. System Architecture

Figure 2:
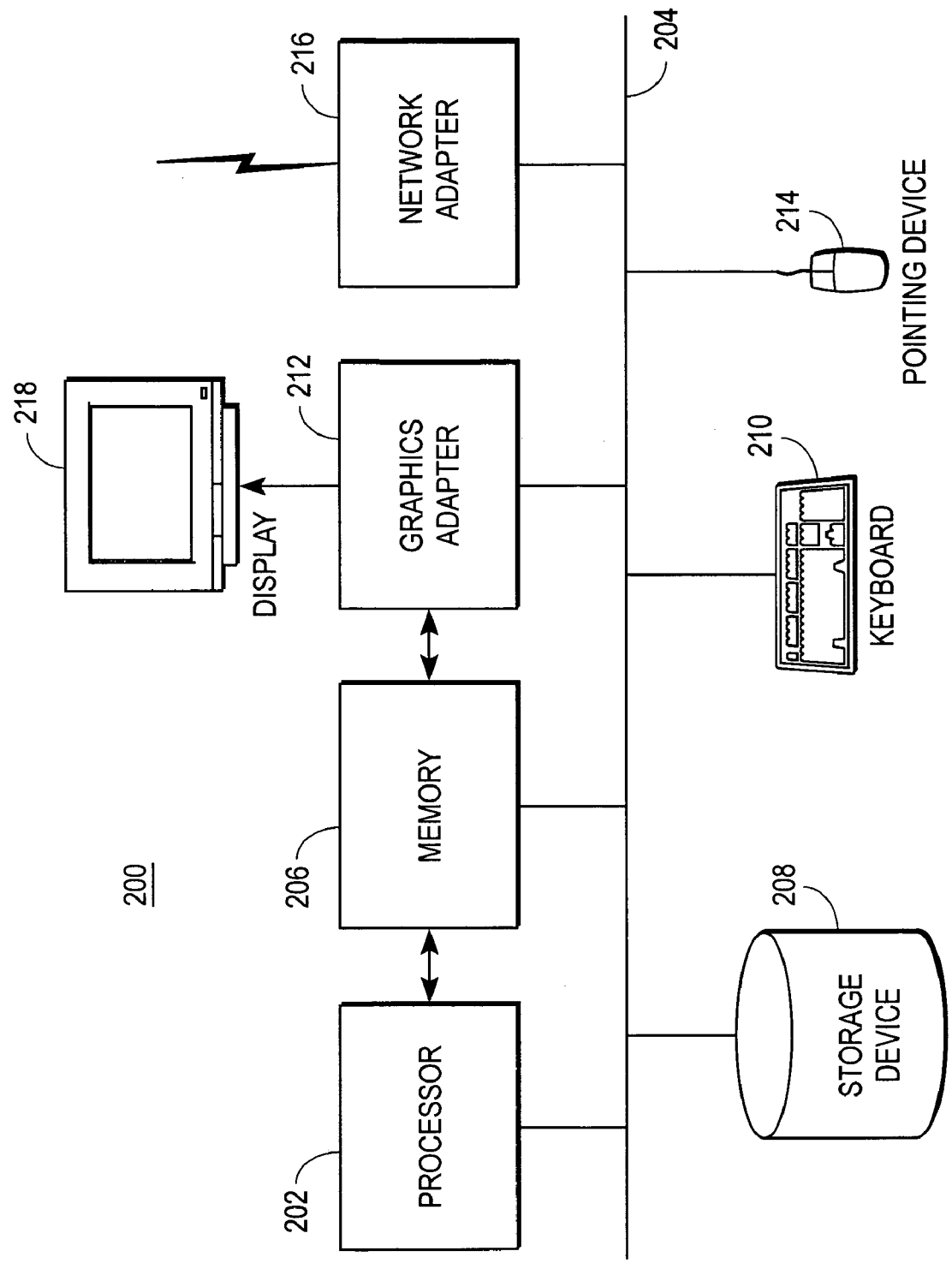
FIG. 2 is a high-level block diagram illustrating a functional view of a typical computer system for use as one of the entities illustrated in the environment of FIG. 1 according to an embodiment of the present invention.

FIG. 2 is a high-level block diagram illustrating a functional view of a typical computer system 200 for use as one of the entities illustrated in the environment 100 of FIG. 1 according to an embodiment of the present invention. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86, SUN MICROSYSTEMS SPARC, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network 108.

As is known in the art, the computer system 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202.

The types of computer systems 200 utilized by the entities of FIG. 1 can vary depending upon the embodiment and the processing power utilized by the entity. For example, the customer 102 typically requires less processing power than the merchant 104 and broker 106. Thus, the customer computer system can be a standard personal computer system. The merchant and broker computer systems, in contrast, may comprise more powerful computers and/or multiple computers working together to provide the functionality described herein.

FIG. 3 is a high-level block diagram illustrating modules within a customer 102 according to one embodiment. Those of skill in the art will recognize that other embodiments can have different and/or other modules than the ones described here, and that the functionalities can be distributed among the modules in a different manner.

As shown in FIG. 3, the customer 102 includes a browser module 310 that allows the customer to view web pages provided by the merchant 104, broker 106, and/or other entities on the network 108. In one embodiment, the browser module 310 is a conventional web browser, such as MICROSOFT INTERNET EXPLORER or MOZILLA FIREFOX. In one embodiment, the browser module 310 maintains a cookie cache 312 that stores cookies associated with web sites on the network 108. The merchant 104 and broker 106 can communicate with the browser module 310 and instruct it to create a cookie in the cookie cache 312 holding certain information. The browser module 310 provides the cookie to the merchant 104 and/or broker 106 when the browser connects to the site that created it.

FIG. 4 is a high-level block diagram illustrating modules within a merchant 104 according to one embodiment. Those of skill in the art will recognize that other embodiments can have different and/or other modules than the ones described here, and that the functionalities can be distributed among the modules in a different manner.

A customer communications module 410 communicates with the customer 102 via the network 108. In one embodiment, the customer communications module 410 includes a web server that provides web pages to the customer 102 and receives end-user input sent over the network 108 by the customer's browser module 310. The customer communications module 410 thus allows a customer to navigate the merchant's web site.

In one embodiment, a broker communications module 412 communicates with the broker 106 via the network 108. In one embodiment, merchant-broker communications are conducted using the web services description language (WSDL). In one embodiment, the broker communications module 412 uses WSDL to describe the services it provides and ascertain the services provided by the broker 106. The broker communications module 412 uses XML-based remote procedure calls (RPCs) to provide information to the broker 106 and receive information in return. In other embodiments, the broker communications module 412 communicates with the broker 106 using other techniques and/or protocols, such as via email messages, HTML web pages intended for review by human users, proprietary communications protocols, etc.

A commerce module 414 operates in tandem with the customer communications module 410 and allows the customer 102 to engage in electronic commerce transactions with the merchant 104. In general, the commerce module 414 allows the merchant 104 to create and manage a catalog of items available for sale. The customer 102 can browse the catalog and indicate items that the customer 102 desires to purchase. In one embodiment, the commerce module 414 utilizes a shopping cart metaphor where items selected by the customer 102 are placed in a virtual shopping cart. The customer can "checkout" and purchase the items in the shopping cart. In one embodiment, the commerce module 414 includes functionality from the open source osCommerce package.

The commerce module 414 provides the customer 102 with one or more payment options at the time of checkout. For example, one payment option can allow the customer 102 to provide payment information directly to the merchant 104. Another payment option can reference an alternative payment system, such as the payment system provided by the broker 106. This latter option may be more desirable to the customer 102 when, for example, the merchant 104 is not well known and the customer is reluctant to provide the payment information to the merchant. The broker 106, on the other hand, may be well known to the customer 102 and an entity to which the customer 102 is comfortable providing payment information. In one embodiment, the commerce module 414 provides a graphic, slogan, and/or other indicia that represents the broker 106 and is designed to convey a sense of trustworthiness to the customer 102.

A broker purchase module 416 interacts with the broker communications module 412 to effect a customer purchase. The broker purchase module 416 is activated if a customer 102 selects the broker payment system for a purchase. In one embodiment, the broker purchase module 416 generates a description of the customer's shopping cart. In one embodiment, the description is encoded in XML, although other techniques can also be used. The description describes the items in the cart, including the type and number of items purchased, and the prices of the items. In one embodiment, the shopping cart description also includes shipping rules describing shipping options and/or rates for the items in the cart, taxation rules applicable to the items, a merchant ID that uniquely identifies the merchant 104, and/or a transaction ID that uniquely identifies the specific purchase transaction. The shopping cart description can also include anticipated shipping dates and/or order processing times. The broker purchase module 416 digitally signs the shopping cart description to prevent third parties from making modifications to it.

In one embodiment, the broker purchase module 416 utilizes the broker communications module 412 to send the shopping cart description to the broker 106. In another embodiment, the broker purchase module 416 uses the customer communications module 410 to provide the shopping cart description to the customer 102 and direct the customer's browser module 310 to send it to the broker 106. The broker purchase module 416 can perform this latter task by, for example, by using a HTTP GET method that codes the shopping cart description into a uniform resource locator (URL) that references the broker 106, and redirecting the customer's browser 310 to the coded URL. In another example, the broker purchase module 416 can use a HTTP POST method that codes the shopping cart description into the body of a request made from the customer's browser 110 to the broker 106.

Figure 5:
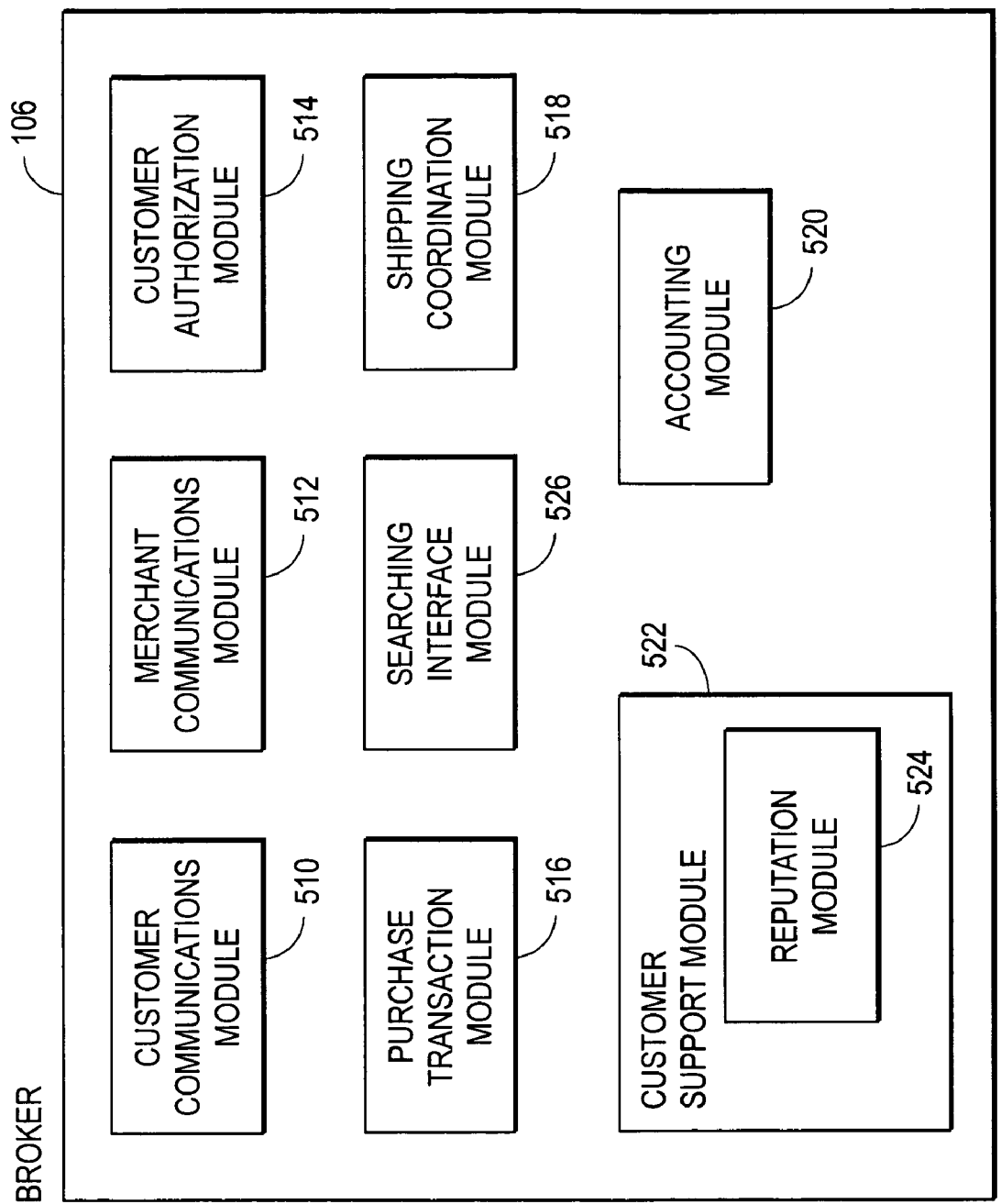
FIG. 5 is a high-level block diagram illustrating modules within the broker according to one embodiment.

FIG. 5 is a high-level block diagram illustrating modules within the broker 106 according to one embodiment. Those of skill in the art will recognize that other embodiments can have different and/or other modules than the ones described here, and that the functionalities can be distributed among the modules in a different manner.

The broker includes a customer communications module 510 and a merchant communications module 512 for respectively communicating with the customer 102 and the merchant 104. In one embodiment, these modules are functionally equivalent to the customer and broker communications modules in the merchant 104.

A customer authorization module 514 authenticates and authorizes customers 102 seeking to use the broker 106 for purchases. In one embodiment, the customer authorization module 514 maintains an ID, password, and/or other information for each customer 102. The customer 102 supplies the correct information in order to identify and authenticate itself. In general, when a customer 102 contacts the broker 106 to make a purchase, the customer's relationship with the broker fits into one of three categories: new customer, existing customer that has not been active recently, or existing active customer. In one embodiment, the customer authorization module 514 determines the category of the customer 102 and responds accordingly.

If the customer 102 is new, an embodiment of the customer authorization module 514 presents the customer with one or more web pages that allow the customer to create an account and select an ID, password and/or other identifying information. In one embodiment, the customer 102 also supplies payment information specifying a charge account and/or creating a stored value. The payment information can include, for example, a credit card number or a gift certificate identifier. The customer can also supply information including mailing/shipping addresses and settings for miscellaneous preferences.

If the customer 102 already has an account but has not been active recently (e.g., within the previous 10 minutes), in one embodiment the customer authorization module 514 provides the customer with the standard login prompt and thereby allows the customer to log into the broker 106. If the customer 102 has been active recently, one embodiment of the customer authorization module 514 allows the customer to directly access the broker 106 without additional authentication procedures. After each successful login, one embodiment of the customer authorization module 514 places a cookie in the customer's browser module 310 that identifies the customer and indicates the time of the customer's last login. In another embodiment, the cookie identifies the expiration date/time after which the customer's activity is no longer considered "recent." The cookie thus allows the customer authorization module 514 to determine the customer's status with respect to the broker 106 and respond appropriately.

A purchase transaction module 516 receives the shopping cart description and allows the customer 102 to complete the purchase transaction for the items in the cart. In one embodiment, the purchase transaction module 516 presents the customer 102 with web pages that describe the items in the cart and allow the customer to specify the methods of payment and shipping, along with any other details that are necessary and/or desired for the transaction. The purchase transaction module 516 uses the shipping address specified by the customer 102 and the shipping rules received from the merchant to calculate the rates for the shipping options. Similarly, the purchase transaction module 516 uses the shipping address and taxation rules from the merchant 104 to calculate any taxes on the purchase. The purchase transaction module 516 determines the total cost of the purchase, charges the customer 102, and provides the customer with a receipt.

A shipping coordination module 518 interacts with the merchant 104 to inform the merchant of the purchase and coordinate shipping of the purchased items to the customer 102. In one embodiment, the shipping coordination module 518 provides the customer-indicated shipping address and shipping options to the merchant 102. In another embodiment, the shipping coordination module 518 instructs the merchant to ship the items to a placeholder or third-party address. In this latter embodiment, the broker 106 electronically notifies the carrier (e.g., Federal Express or United Parcel Service) to redirect the package to the customer's true shipping address. This embodiment thus keeps the customer 102 completely anonymous to the merchant 104.

An accounting module 520 monitors the transactions that occur using the broker 106, invoices the customers 102, and credits the merchants 104. In a typical case, the accounting module 520 charges the customer's credit card or other method of payment and credits the merchant's account for the amount of the purchase. In another embodiment, the accounting module 520 aggregates purchases made by the customers and then periodically credits each merchant for the value of the purchases made within the time period. In yet another embodiment, the accounting module 520 aggregates a customer's purchases within a given time period and then charges the customer's account once for aggregate total of the purchases. This latter embodiment might be desirable where, for example, the customer 102 makes many small purchases.

A customer support module 522 allows customers 102 to request refunds and/or perform other customer-support related tasks. In one embodiment, the broker 106 provides a satisfaction guarantee and allows customers to obtain refunds on purchases with relative ease. This refund policy provides the customers 102 with added security and may make the customers more willing to purchase items from relatively unknown and/or untrustworthy merchants 104.

In one embodiment, the customer support module 522 includes a reputation module 524 that monitors transactions performed by the broker and calculates reputation scores for the customers 102 and/or merchants 104. In one embodiment, the reputation module 524 calculates a volume rating that indicates the percentage of transactions for which a customer has requested a refund or otherwise disputed. Similarly, in one embodiment the reputation module 524 calculates an amount rating that indicates the cash value of a customer's disputed transactions as a percentage of the customer's total transactions. In another embodiment, the reputation module 524 calculates the percentages of merchants' sales that are disputed by the customers 102. In one embodiment the reputation scores are used to detect potential fraud.

In one embodiment, a searching interface module 526 provides the customers 102 with access to content searching capabilities. These capabilities allow a customer 102 to provide the searching interface module 526 with a search query that specifies search parameters such as keywords, meta-data describing desired results, and/or other information and receive in return a list of content that at least partially satisfies the query. In one embodiment, the search query is generated implicitly based on actions performed by the customer 102 and/or other criteria. In one embodiment, the searching interface module 526 interfaces with a search engine provided by GOOGLE INC. of Mountain View, Calif. The search engine searches for content and/or items provided by the merchants 104 that satisfy the queries. In one embodiment, the search engine also searches other domains. The searching interface module 526 is used, for example, by customers 102 seeking items that can be purchased through the broker 106.

III. Process/Example

Figure 6:
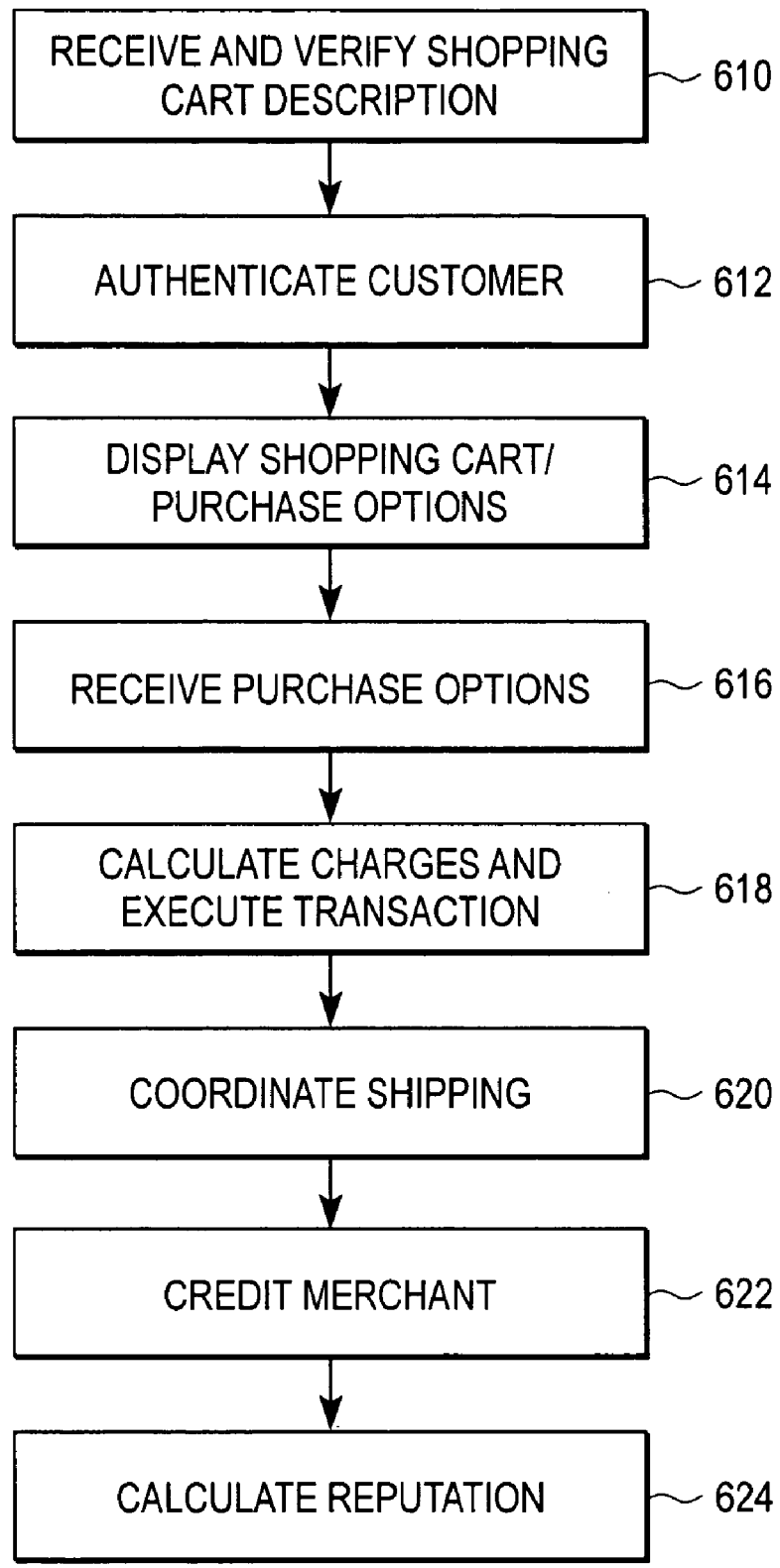
FIG. 6 is a flow chart illustrating the operation of the broker according to one embodiment.

FIG. 6 is a flow chart illustrating the operation of the broker 106 according to one embodiment. Those of skill in the art will recognize that other embodiments can perform the steps of FIG. 6 in different orders. Moreover, other embodiments can include different and/or additional steps than the ones described here.

FIG. 6 illustrates steps performed by the broker 106 in an exemplary transaction where a customer 102 is purchasing an item from a merchant 104. Assume for purposes of this example that the customer 102 uses a web browser to browse the merchant's web site, and selects one or more items to purchase. The merchant 104 places the items in a virtual shopping cart, and offers the customer 102 the option to checkout using the broker 106. The customer 102 selects this option and is directed by the merchant 104 to a broker web site.

The broker 106 receives and verifies 610 the shopping cart description. In one embodiment the broker 106 receives the shopping cart description from the customer 102 as part of a URL or request. In another embodiment, the broker 106 receives the shopping cart description directly from the merchant 104. The broker 106 verifies the shopping cart description by, for example, verifying a digital signature of the merchant 104.

The broker 106 authenticates 612 the customer 102. This step can occur, for example, by asking the customer for an ID, password and/or other identifying information, reading a cookie provided by the customer's browser 310, and/or through another technique. The broker 106 displays 614 a representation of the shopping cart to the customer 102. The broker 106 also displays 614 web page buttons or another interface that the customer 102 uses to select purchase options, such as a shipping method and address. These purchase options are derived in part from data included in the shopping cart description. The customer 102 selects the desired options, and the broker receives 616 the selections from the customer's browser 310.

The broker 106 uses the purchase options selected by the customer 102 to calculate 618 the total charge for the transaction. These calculations typically take into account the cost of the items in the cart, shipping method selected by the customer 102, applicable taxes, and/or any other charges described by the merchant 104 in the shopping cart description. The broker 106 executes 618 the transaction by charging the customer's credit card, subtracting a value from a stored value account, and/or performing an equivalent action.

The broker 106 coordinates 620 shipping with the merchant 104. In one embodiment, the broker 106 supplies the customer-indicated shipping address and method to the merchant 104 and instructs the merchant to ship the purchased items directly to the customer 102. In another embodiment, the broker 106 instructs the merchant to ship the items to a placeholder address. The broker 106 then communicates with the shipper to direct the package containing the items to the customer's shipping address.

The broker 106 credits 622 the merchant 104 for the transaction. In one embodiment, the broker 106 keeps percentage of the transaction and/or charges the merchant 104 a fee for conducting the transaction. In addition, the broker 106 calculates 624 the reputation of the customer 102 and/or merchant 104 in response to the transaction. The reputation may change based on subsequent events, such as the customer 102 requesting a refund for the transaction.

The broker 106 thus serves as a centralized information store for the customers' data. This centralized store provides better security because it allows customers 102 to make purchases from multiple merchants 104 without providing the customers' personal data to each merchant. In fact, in one embodiment the customers 104 remain completely anonymous to the merchants 104. In addition, using the broker 106 is beneficial to merchants because it allows them to increase their sales by lowering their barriers to purchase and leveraging off the reputation and trustworthiness of the broker 106.

The above description is included to illustrate the operation of the preferred embodiments and is not meant to limit the scope of the invention. The scope of the invention is to be limited only by the following claims. From the above discussion, many variations will be apparent to one skilled in the relevant art that would yet be encompassed by the spirit and scope of the invention.

We claim:

1. A broker in an electronic commerce system, the broker comprising:
   a non-transitory computer-readable storage medium having executable computer program instructions for facilitating electronic commerce transactions between remote customers and remote merchants, the computer program instructions comprising:
      a communication module configured to receive a description of a virtual shopping cart at the broker from a remote customer device responsive to a purchase module on a remote merchant providing the shopping cart description to the customer device and directing the customer device to send the shopping cart description to the broker, the shopping cart description identifying an item for purchase by a customer from the merchant, the communication module further configured to present the customer with an interface with which the customer can select options associated with the purchase from the merchant;
      a transaction module configured to calculate at the broker a purchase total responsive to the shopping cart description received from the customer device and the options selected by the customer, and to charge the customer for the purchase total; and
      a coordination module configured to interface the broker with the merchant to inform the merchant of the purchase; and
   a processor for executing the computer program instructions.

2. The broker of claim 1, wherein the description of the virtual shopping cart received by the communication module is encoded in a hypertext transport protocol (HTTP) message.

3. The broker of claim 1, wherein the description of the virtual shopping cart received from the customer device includes shipping rules and taxation rules applicable to the item, the shipping rules and taxation rules for calculating the purchase total.

4. The broker of claim 3, wherein the shipping rules indicate shipping options and rates applicable to the item and the taxation rules indicate taxes potentially applicable to the item.

5. The broker of claim 1, wherein the options selected by the customer include shipping options and wherein the transaction module is configured to calculate the purchase total responsive to the selected shipping options and shipping rules included in the description of the virtual shopping cart.

6. The broker of claim 1, wherein the coordination module is configured to instruct the merchant to ship the item to a placeholder address via a carrier, and to interface with the carrier to direct the shipped item to a shipping address selected by the customer.

7. The broker of claim 1, wherein the computer program instructions further comprise:
   a support module configured to calculate a reputation score for the merchant and/or customer responsive to the purchase.

8. The broker of claim 1, wherein the purchase module on the merchant uses an HTTP GET method to direct the customer device to send the shopping cart description to the broker.

9. The broker of claim 1, wherein the purchase module on the merchant uses an HTTP POST method to direct the customer device to send the shopping cart description to the broker.

10. A computer program product having a non-transitory computer-readable storage medium having executable computer program instructions embodied therein for providing a broker to facilitate electronic commerce transactions between remote customers and remote merchants, the computer program instructions comprising:
    a communication module configured to receive a description of a virtual shopping cart at the broker from a remote customer device responsive to a purchase module on a remote merchant providing the shopping cart description to the customer device and directing the customer device to send the shopping cart description to the broker, the shopping cart description identifying an item for purchase by a customer from the merchant, the communication module further configured to present the customer with an interface with which the customer can select options associated with the purchase from the merchant;
    a transaction module configured to calculate at the broker a purchase total responsive to the shopping cart description received from the customer device and the options selected by the customer, and to charge the customer for the purchase total; and
    a coordination module configured to interface the broker with the merchant to inform the merchant of the purchase.

11. The computer program product of claim 10, wherein the description of the virtual shopping cart received by the communication module is encoded in a hypertext transport protocol (HTTP) message.

12. The computer program product of claim 10, wherein the description of the virtual shipping cart received from the customer device includes shipping rules and taxation rules applicable to the item, the shipping rules and taxation rules for calculating the purchase total.

13. The computer program product of claim 12, wherein the shipping rules indicate shipping options and rates applicable to the item and the taxation rules indicate taxes potentially applicable to the item.

14. The computer program product of claim 10, wherein the options selected by the customer include shipping options and wherein the transaction module is configured to calculate the purchase total responsive to the selected shipping options and shipping rules included in the description of the virtual shopping cart.

15. The computer program product of claim 10, wherein the coordination module is configured to instruct the merchant to ship the item to a placeholder address via a carrier, and to interface with the carrier to direct the shipped item to a shipping address selected by the customer.

16. The computer program product of claim 10, further comprising:
a support module configured to calculate a reputation score for the merchant and/or customer responsive to the purchase.

17. The computer program product of claim 10, wherein the purchase module on the merchant uses an HTTP GET method to direct the customer device to send the shopping cart description to the broker.

18. The computer program product of claim 10, wherein the purchase module on the merchant uses an HTTP POST method to direct the customer device to send the shopping cart description to the broker.

19. A method for facilitating electronic commerce transactions between remote merchants and remote customers, comprising:
receiving a description of a virtual shopping cart at a broker from a remote customer device, where a purchase module on a remote merchant provided the shopping cart description to the customer device and directed the customer device to send the shopping cart description to the broker, the shopping cart description identifying an item for purchase by a customer from the merchant;
presenting the customer with an interface generated responsive to the description of the virtual shopping cart with which the customer can select options associated with the purchase from the merchant;
calculating at the broker a purchase total responsive to the shopping cart description received from the customer device and the options selected by the customer, and charging the customer for the purchase total; and
interfacing the broker with the merchant to inform the merchant of the purchase.

20. The method of claim 19, wherein the description of the virtual shopping cart is encoded in a hypertext transport protocol (HTTP) message.

21. The method of claim 19, wherein the description of the virtual shipping cart received from the customer device includes shipping rules and taxation rules applicable to the item, the shipping rules and taxation rules for calculating the purchase total.

22. The method of claim 21, wherein the shipping rules indicate shipping options and rates applicable to the item and the taxation rules indicate taxes potentially applicable to the item.

23. The method of claim 19, wherein the options selected by the customer include shipping options and the calculating step calculates the purchase total responsive to the selected shipping options and shipping rules included in the description of the virtual shopping cart.

24. The method of claim 19, wherein the step of interfacing with the merchant comprises:
instructing the merchant to ship the item to a placeholder address via a carrier; and
interfacing with the carrier to direct the shipped item to a shipping address selected by the customer.

25. The method of claim 19, further comprising:
calculating a reputation score for the merchant and/or customer responsive to the purchase.

26. The method of claim 19, wherein the purchase module on the merchant uses an HTTP GET method to direct the customer device to send the shopping cart description to the broker.

27. The method of claim 19, wherein the purchase module on the merchant uses an HTTP POST method to direct the customer device to send the shopping cart description to the broker.

28. A non-transitory computer-readable storage medium having executable computer program instructions for providing a broker in a system having remote customers and remote merchants, a remote merchant in the system having a purchase module configured to provide shopping cart descriptions to customer devices and to direct the customer devices to send the shopping cart descriptions to the broker, the broker for facilitating electronic commerce transactions between the remote customers and the remote merchants, the computer program instructions comprising:
a communication module configured to receive a description of a virtual shopping cart at the broker from a remote customer device responsive to the purchase module on the remote merchant providing the shopping cart description to the customer device and directing the customer device to send the shopping cart description to the broker, the shopping cart description identifying an item for purchase by a customer from the merchant, the communication module further configured to present the customer with an interface with which the customer can select options associated with the purchase from the merchant;
a transaction module configured to calculate at the broker a purchase total responsive to the shopping cart description received from the customer device and the options selected by the customer, and to charge the customer for the purchase total; and
a coordination module configured to interface the broker with the merchant to inform the merchant of the purchase.

* * * * *